United States Patent [19]

Oxley

[11] Patent Number: 4,736,775

[45] Date of Patent: Apr. 12, 1988

[54] FOOD CASING SPLICE HAVING DUAL PRESSURE SENSITIVE TAPES

[75] Inventor: Jeffery A. Oxley, Naperville, Ill.

[73] Assignee: Viskase Corporation, Chicago, Ill.

[21] Appl. No.: 946,347

[22] Filed: Dec. 24, 1986

[51] Int. Cl.[4] .................. B65D 81/34; F16L 11/02
[52] U.S. Cl. .................. 138/118.1; 138/120; 156/158; 156/215; 156/304.2; 156/332; 426/105; 428/61; 428/212; 428/508; 428/523
[58] Field of Search ............... 156/157, 158, 212, 215, 156/304.2, 304.1, 332; 138/118.1, 120; 428/36, 57, 58, 61, 212, 508, 523; 426/105

[56] References Cited

U.S. PATENT DOCUMENTS

| | | | |
|---|---|---|---|
| 2,294,347 | 8/1942 | Bauer et al. | 428/212 |
| 3,127,303 | 3/1964 | Neuhauser et al. | 428/61 |
| 3,235,289 | 2/1966 | Jones | 156/304.2 |
| 3,573,146 | 3/1971 | Guinan et al. | 428/61 |
| 3,666,586 | 5/1972 | Lacey | 156/158 |
| 4,032,176 | 6/1977 | Tabary | 156/158 |
| 4,207,429 | 6/1980 | Ward | 156/49 |
| 4,391,302 | 7/1983 | Huhn et al. | 138/118.1 |
| 4,396,039 | 8/1983 | Klenk et al. | 138/118.1 |
| 4,440,821 | 4/1984 | Komura et al. | 428/212 |
| 4,610,742 | 9/1986 | Rop et al. | 156/158 |
| 4,630,846 | 12/1986 | Nishino | 156/304.2 |

Primary Examiner—Jerome Massie
Attorney, Agent, or Firm—Roger Aceto

[57] ABSTRACT

A spliced casing and method wherein two pressure sensitive adhesive tapes are used to join the ends of cellulosic casing. A first tape adheres directly to the casing. A second tape, which is wider than the first tape, is wrapped about the first tape so lateral side margins of the second tape overlap the opposite side edges of the first tape and are adhered directly to the casing.

18 Claims, 2 Drawing Sheets

FOOD CASING SPLICE HAVING DUAL PRESSURE SENSITIVE TAPES

TECHNICAL FIELD

The present invention relates generally to a splice for food casings and more particularly to a casing splice and method for joining sections of cellulosic food casings together with adhesive strips.

BACKGROUND OF THE INVENTION

Sausage casings of regenerated cellulose are well known in the art. These casings are formed by extruding regenerated cellulose into tubes or by coating a roll of paper with viscose and then regenerating the cellulose. The casing thus formed is then further treated for sale to a customer. For example, the casing is moisturized to permit its stuffing without the need for soaking the casing. The casing also can be provided with various coatings to facilitate its use in stuffing and subsequent processing operations. Typical coatings applied to the casings include moisture and/or oxygen barriers and liquid smoke.

For some stuffing operations the casing is supplied to the customer in a shirred form. For other stuffing operations the casing is supplied in the form of rolled flat stock. To insure a continuous stuffing operation, the casing, whether supplied in shirred form or as roll stock, should be a continuous casing length. Shirred casing usually is not supplied in lengths greater than about 300 feet whereas a roll of flat stock may contain upwards of fifteen hundred (1500) feet or more of casing.

Providing a roll of casing containing upwards of 1500 feet of casing presents a problem due to the difficulty in making a single casing length of the relatively long length required for roll stock. This is because the casing may break during manufacture or a defect may appear in the casing which must be removed. This results in lengths shorter than the whole multiple length of casing needed for each roll. Short lengths can be spliced together to provide the whole multiple length of casing desired, but splices generally are considered undesirable and preferably are voided. For example, it is difficult to provide a splice which is not degraded over time by moisture, liquid smoke or other casing constituent and which is able to withstand the rigors of the stuffing operation. Accordingly, it is not unusual for a casing manufacturer to discard less than whole multiple lengths of casing or use them for other purposes rather than provide the customer with a roll of casing containing one or more splices.

A typical stuffing operation using roll stock puts a considerable strain on the casing. The flat casing from the supply roll is laced over a series of feed rolls including one or more dancer rolls and then it is opened and fed onto the stuffing horn. Periodically during the stuffing operation, the dancer roll impacts the flat casing. This subjects the casing to sudden and violent tensile stresses. Several impacts may occur in the vicinity of each splice. If the splice fails, the machine must be shut down and the casing relaced through the feed and dancer rolls.

The splice also is subjected to a more sustained tensile stress when the casing is pulled taut to gather it about the ends of the stuffed product during a closing operation. Thus, it is important that the splice be strong enough to withstand the rigors of stuffing so as to avoid a production interruption caused by splice failure.

Heretofore, one splice technique involved simply telescoping or butting the ends of the casing to be joined and then wrapping the joint with a pressure sensitive adhesive tape. This method is described as prior art in U.S. Pat. No. 4,032,176. A taped splice described as prior art in the U.S. Pat. No. 4,032,176 is not suitable for use in stuffing operations because moisture or other casing constituents weaken the splice over time and cause it to fail when subjected to the rigors of a stuffing operation.

If the tape backing has a low tensile strength it may fail under the impact of the dancer rolls or under the sustained tensile stress of the gathering/clipping operation. If the backing is strong enough to withstand these stresses, then the impact of the dancer rolls or the longitudinal strain of gathering and clipping causes the tape adhesive to fail. Failure of the adhesive is not uncommon because moisture in the casing beneath the tape weakens the adhesive bonding. It also should be appreciated that, as set out hereinabove, the casing may be coated or impregnated with other materials such as liquid smoke which also tend to weaken or prevent a pressure sensitive adhesive bonding.

Prior art publications such as U.S. Pat. Nos. 4,391,302 and 4,610,742 disclose that pressure sensitive adhesives are not suitable for casing splices and that high strength splices require a curing of the adhesive bond with a combination of heat and pressure. While such splices may be sufficient to withstand the rigors of stuffing, they require special equipment and are time consuming and inconvenient to fabricate on the production line during the manufacture and rolling of the flat casing.

Accordingly, there is a need for an improved spliced casing article and splicing method. In particular, there is a need for a casing splice and splicing method utilizing a pressure sensitive adhesive tape for joining casings wherein the casings are premoisturized to at least about 20% moisture based on the total weight of the casing and wherein the casings may be coated or impregnated with other constituents, such as liquid smoke, that may resist or inhibit pressure sensitive adhesive bonding.

Failure of casing splices made with pressure sensitive adhesive tapes occurs in either of two modes. In one mode the tape backing fails when a casing is subjected to a tensile stress. That is, the adhesive doesn't fail, but the tape backing tears so that portions of the tape remain adhered to each of the separated casing ends. In a second mode, the tape backing remains intact but the adhesive fails so that the tape pulls free from one of the casing ends. This type of splice failure is observed even though the tape has an adhesive which exhibits good adherence to the moisturized cellulosic casing.

Close examination of splice failures of the second mode establishes that the failures initiate at the lateral edges of the tape transverse the longitudinal axis of the casing and particularly at points along these edges where the tape has lifted or separated from the casing. Once the lateral edge of the tape has lifted from the casing, tensile stresses (as caused, for example, by a dancer roll impacting against the casing or by gathering and closing the casing) cause the tape to peel rapidly from the casing in a direction parallel to the longitudinal axis of the casing. Failure is a peeling-type failure or "adhesive" failure rather than a "cohesive" failure. "Cohesive" failure as used herein means a shear failure of the tape adhesive so that portions of the adhesive remain adhered to both the casing and the tape backing after the splice fails. In contrast with cohesive failure, a "peeling type" failure or "adhesive" failure as used herein means a failure which results when an edge of the tape peels from the casing so that the tape adhesive remains intact on the tape backing and little or none of the adhesive remains on the casing. In general, less force is required to cause an adhesive failure than to cause a cohesive failure. It has been observed that once a lateral edge of the tape begins to lift or is separated from the casing, peeling or adhesive failure progresses very rapidly.

Splices of prior art U.S. Pat. Nos. 4,391,302 and 4,610,742 exhibit relatively high peel strengths because heat and pressure are used to cure a bond between the casing and the splice material. However, it is an object of the present invention to provide a casing splice and splicing method which uses a pressure sensitive adhesive tape for joining lengths of cellulosic casing without heat and pressure curing of the adhesive bond.

SUMMARY OF THE INVENTION

It has been found that contrary to the prior art teaching, an effective splice can be made without the need for curing the adhesive bond between the casing and splice material. More particularly, the present invention is a spliced fibrous casing characterized by (a) at least two lengths of cellulosic casing having longitudinally axially aligned adjacent ends to be joined, each casing length having a moisture content of at least 20% by total casing weight, a first portion located next to the casing end to be joined and a second portion located more inboard from the casing end than the first portion;

(b) a first pressure sensitive adhesive tape encircling the adjacent ends and disposed against the casing lengths, the first adhesive tape being in only pressure sensitive adhering relationship with the casing lengths wherein opposite lateral side edges of the first adhesive tape adhere directly to the first portion of each casing length for joining the casing lengths; and (c) adhesive tape means encircling and disposed in only pressure sensitive adhering relationship against the first adhesive tape, the adhesive tape means having lateral side margins which overlap the opposite lateral side edges of the first tape and which adhere in only pressure sensitive adhering relationship directly to the second portion of each casing length, the adhesive tape means comprising means to restrain the separation of the overlapped first tape side edges from the casing lengths responsive to transverse and longitudinal loading on the spliced casing.

In its method aspect the invention comprises the steps of (a) longitudinally axially aligning the ends of cellulosic casing lengths to be joined;

(b) wrapping a first pressure sensitive adhesive tape around the aligned ends and adhering the tape by pressure alone to each of the casing lengths with the opposite lateral side edges of the tape adhering to a first portion of each casing length located next to the aligned ends of the casing for joining the casing lengths together:

(c) wrapping a pressure sensitive adhesive tape means about the first tape with the opposite lateral side margins of the tape means overlapping the opposite side edges of the first tape and adhering the tape means by pressure alone directly to both the first tape and to a second portion of each casing located more inboard from the aligned casing ends than the first portion; and (d) utilizing the overlapping disposition of the second tape means lateral side margins with respect to the first tape side edges as means for restraining the separation of the first tape side edges from their pressure sensitive adhering realtionship with the joined casing lengths.

In the invention, two pressure sensitive adhesive tapes are used for making the splice. The first tape is applied directly to the casing lengths for joining the lengths together. The second tape is applied around the first tape.

For purposes of the present invention, the second tape must overlap the lateral side edges of the first tape so that a portion of the second tape adheres directly to the casing. This overlap can be accomplished by using a second tape which is wider than the first tape or by using two strips of the second tape wherein each strip is disposed over one of the side edges of the first tape.

By using a second tape in this fashion, the second tape functions as a means to hold the side edges of the first tape against the casing. This restrains the side edges from lifting and thereby inhibits the initiation of a peeling-type failure of the first tape. The second tape may begin to fail in a peeling mode but the peeling failure of the second tape is interrupted at the edge of the first tape. The peeling failure of the second tape does not progress continuously to the first tape so that the failure of the first tape is delayed to the point where the splice can pass through the stuffing operation without failing.

The present invention allows use of tapes which individually posses only marginal characteristics for making an acceptable splice. For example a splice made with a tape which initially adheres to the moisturized casing may degrade over time and fail in use or the tensile strength of the tape backing may be marginal. However, according to the present invention an acceptable splice can be made by using two of the tapes and overlapping the edges of the first tape with the second.

Use of two tapes also allows for optimizing the strength of the splice by selecting individual tapes for their particular tensile strength or adhesive strength characteristics. For example, a first tape may exhibit good adhesion to the moisturized casing but the tape backing may lack the required tensile strength. A second tape may exhibit poorer adhesion to the moisturized casing but it has a backing of a high tensile strength. In this case, use of the tapes together can provide a functional splice wherein the second tape is applied so it overlaps the side edges of the first tape. The first tape adheres to the casing for joining two lengths together. The second tape, being adhered to the backing of the first tape, provides the required tensile strength.

In any event, the second tape, by overlapping the side edges of the first tape, maintains these side edges adhered to the casing and thereby retards the peeling mode failure of the first tape. It is essential to the invention that the lateral side margins of the second tape overlap both of the side edges of the first tape. This can be accomplished either by selecting a second tape which is wider than the first tape or by using two strips of the second tape. With this construction, even a tape which exhibits only marginal adherence to the casing material will suffice to keep the lateral side edges of the first tape adhered to the casing and will prevent these side edges from lifting or separating from the casing. As set forth hereinabove, if both side edges of the first tape are kept adhered to the casing and prevented from lifting, peeling type failures of the splice is greatly reduced and the functionality of the splice is improved.

DETAILED DESCRIPTION OF THE INVENTION

Figure 1:
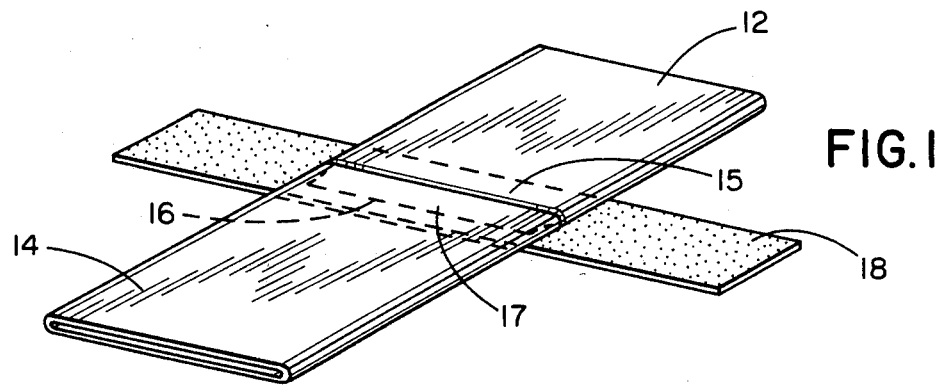
FIGS. 1–4 are perspective views showing a sequence of steps for making the splice of the present invention.

Refering to the drawings, FIG. 1 shows sections 12, 14 of two casing lengths to be joined. Preferably the casing is a conventional cellulosic casing including a web of fibrous reinforcing material. Such casing, commonly referred to as "fibrous casing", is well known in the art and typically contains at least 20 wt. % moisture for use in a stuffing process. However, it is preferred that the splice be fabricated prior to the time the casing is moisturized to this moisture level to facilitate adherence of a pressure sensitive splice tape to the casing. At the time the splice is formed, the casing typically has a moisture content of about 6% by total casing weight. After the splice is made the casing is moisturized by conventional means to raise its moisture content to at least 20% by weight of the casing and optional constituents such as liquid smoke are added.

Figure 2:
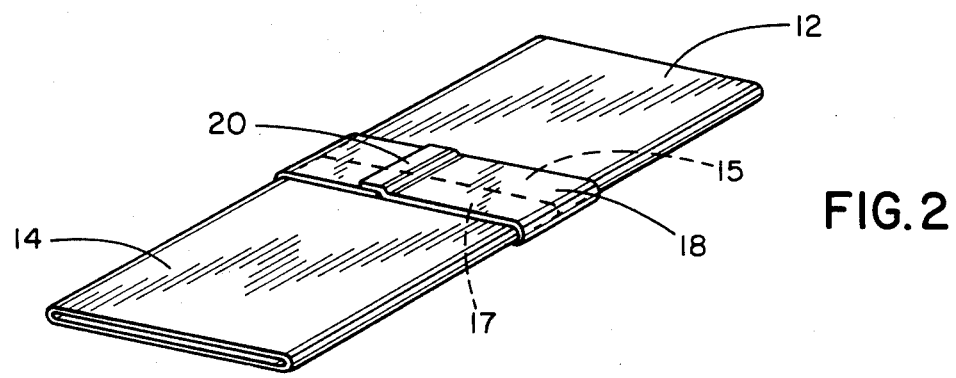
Figure 5:
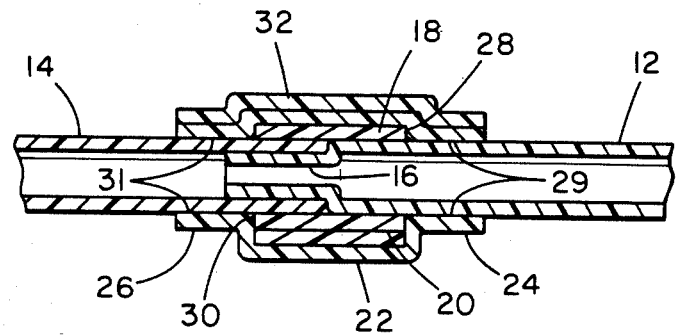
FIG. 5 is a longitudinal sectional view of the splice taken along line 5—5 of FIG. 4 wherein the thickness of the casing and splice tapes have been exaggerated for clarity.

To make the splice, casing sections 12,14 are longitudinally aligned. The ends of each casing can be butted one against the other or they can be positioned with a slight gap between them. It is preferred, however, to telescope an end 16 of one casing length into the other casing length as shown in FIG. 5. With the two casing lengths in this position a first splicing tape 18 (FIG. 1) is wrapped on one side of the casing sections 12, 14. This tape is folded over and its ends lapped at 20 (FIG. 2) in order to join the two casing lengths. Preferably first tape 18 should be about two inches wide so that at least one inch of tape adheres to a first portion 15, 17 of each casing located next to the ends to be joined. While it is important for tape 18 to adhere to the casing, the tensile strength of the tape is of lesser importance.

A tape which is shown by tests to exhibit good adherence over time to a moisturized, liquid smoke containing fibrous casing is a Patco Corporation No. 503A tape. The backing of this tape is a low density polyethylene film having a tensile strength of about 10 lbs/inch width. The adhesive on the backing is an acrylic based pressure sensitive adhesive. More particularily, the adhesive, according to analysis by infrared spectroscopy, is 2-ethylhexylacrylate with minor amounts of polyvinylacetate.

Figure 3:
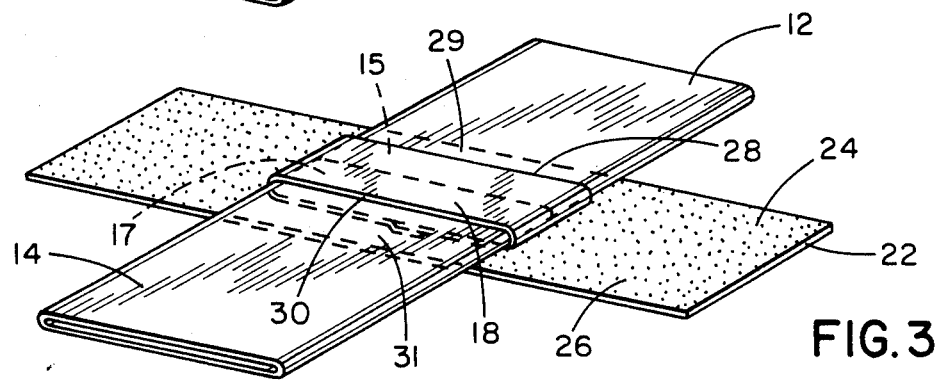
Figure 4:
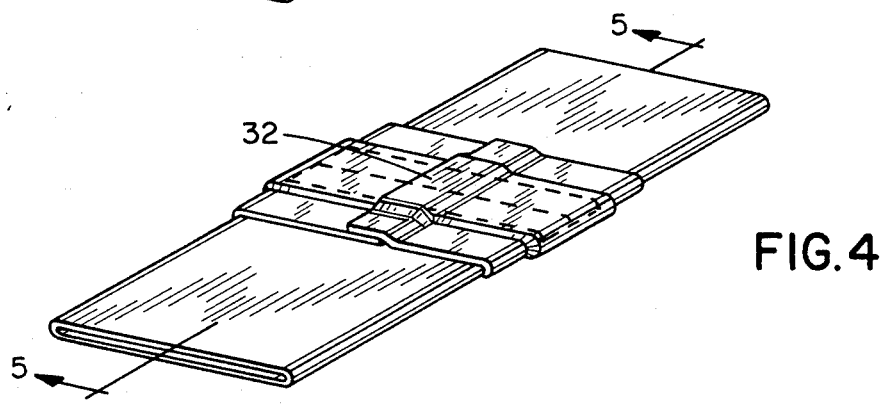

The joined sections of casings are then turned upside down (FIG. 3) so that the lap 20 (not shown) of tape 18 is on the bottom side of the casing. As shown in FIG. 3 a second tape 22 is then wrapped on the backside of the joined casing sections 12, 14 and is pressed against the backing of the first tape 18. The second adhesive tape 22 is wider than the first adhesive tape 18 so the lateral opposite side margins 24, 26 of the second tape overlap the corresponding opposite side edges 28, 30 of the first tape. The side margins 24, 26 adhere directly to a second portion 29, 31 of each casing located more inboard from the joined casing ends than the first casing portion 15, 17. The second tape is then wrapped about the first tape and its ends lapped as shown at 32 (FIG. 4).

A tape which is useful as the second tape 22 is a 3M adhesive tape No. 855. The backing of this tape is a nylon film having a tensile strength of 25 lbs/inch width. The adhesive on the backing is a highly cured rubber based adhesive. More particularly, the adhesive according to analysis by infrared spectroscopy, is an epoxidized polybutadiene polystyrene copolymer in about a 4:1 to 5:1 ratio.

As best seen in FIG. 5 the two tapes 18, 22 are arranged so that the lap 20 of tape 18 is on one side of the casing whereas the lap 32 of the second tape 22 is on the opposite side of the casing. FIG. 5 also shows that the side margins 24, 26 of the second tape overlap the side edges 28, 30 of the first tape and are adhered directly to the casing portions 29, 31. Preferably the second tape 22 should be approximately three inches wide so that each of the lateral side margins 24, 26 provide about a half inch of overlap.

For purposes of the present invention the overlap is important. It is the overlap which maintains the side edges 28, 30 of the first tape adhered against the casing and which restrains these side edges from lifting or peeling from the casing. Thus, any peeling which is initiated at the side edges of the second tape 22 does not immediately initiate a failure of the splice in that the side edges of the first tape 18 remain stuck to the casing even after the corresponding edges of the second tape have begun to peel from the casing.

After the splice is made the casing is moisturized to raise its moisture level to at least 20% by total casing weight. Subsequent operations also involve treating or coating the casing with other constituents such as liquid smoke. The casing is then rewound onto reels for eventual shipment to the customer.

Figure 6:
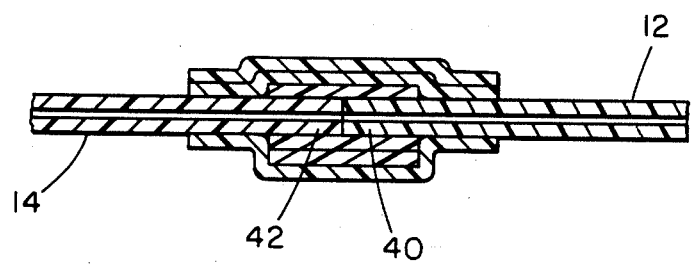
FIGS. 6–8 are views similar to FIG. 5 only showing other embodiments of the splice.

FIG. 6 shows another embodiment of the invention wherein the ends 40, 42 of the two casing lengths 12, 14 are butted one against another rather than telescoped together as shown in FIG. 5.

Figure 7:
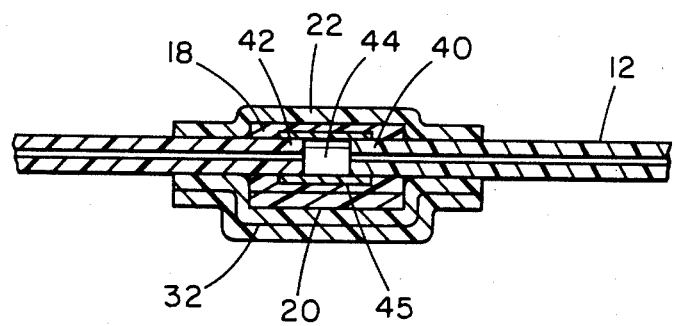

FIG. 7 shows still another embodiment wherein the ends of 40, 42 of the casing are positioned with a gap 44 between the ends. In this embodiment the splice bridges the gap to hold the casing lengths together. In a gap splice care must be taken to prevent the ahesive tape which is exposed by the gap from adhering to itself. Otherwise it may be difficult to open the flat casing. A foil or film 45 which bridges the gap 44 should be sufficient for this purpose.

FIG. 7 also shows another arrangement of the lapped ends of each adhesive tape. In this respect it shows that the lapped ends 20 of the first tape 18 and the lapped ends 32 of the second tape 22 are on the same side of the casing.

Figure 8:
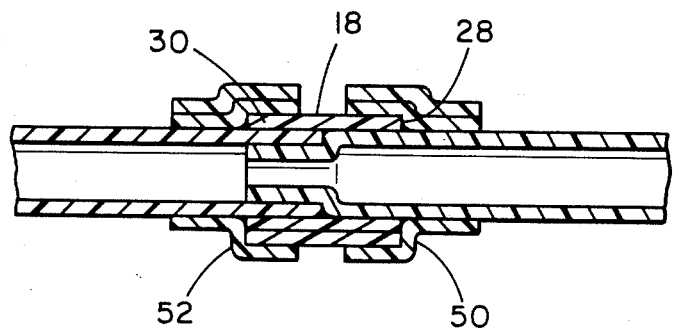

In the embodiment of FIG. 8 two strips 50, 52 of the second tape are used to overlap the opposite side edges 28, 30 of the first tape 18. In this embodiment the two strips of the second tape will function in accordance with the teachings of the present invention to maintain the side edges of the first tape adhered to the casing thereby slowing the rate of peeling failure. However, since these two strips do not extend completely bridge the first tape, they should not be relied upon to add tensile strength to the splice. Accordingly, the embodiment of FIG. 8, the tape backing of first adhesive tape 18 should have sufficient tensile strength to resist tearing when subjected to the rigors of a stuffing operation. In the alternative a third tape (not shown) can be used to bridge between the two strips 50, 52 of the second tape.

In a first test, both the Patco 503A tape and the 3M No. 855 tape were used individually to splice together lengths of fibrous cellulosic casing having a flat width of about eight inches. The casings were then moisturized, impregnated with liquid smoke and aged to insure that the moisture level had equilibrated throughout the casing (including the area beneath the tapes) to at least 20 wt. %. The splices were then subjected to both Instron tensile testing and impact testing.

In the Instron test, the casing is pulled longitudinally at a constant rate of extension of twenty (20) inches per minute while recording the applied force. The Patco No. 503A tape was observed to undergo an adhesive failure in the peeling mode, on average, at about 130 lb. whereas the 3M No. 855 tape had a similar failure at only about 63 lb. This showed that the acrylic based adhesive of the Patco tape had better adherence to the moisturized casing than the rubber based adhesive of the 3M tape.

Splices made with these individual tapes were then subjected to an impact test. The impact test is intended to simulate an impact as may be directed against the casing by a dancer roll. In the impact test the ends of about a four foot section of spliced casing are clamped so as to form a loop of casing about two feet long. The casing at each end of the loop passes under a three inch diameter roller and the center of the loop containing the splice, passes over a third three inch roll. This third roll is attached to a pneumatic cylinder arranged to slam the third roll against the flat casing.

When the cylinder is pressurized to 60 psi, the third roll is slammed against the spliced casing. The backing of the Patco tape failed after only 1-4 slams. No impact tests were made of the 3M No. 855 tapes because the adhesive failure of this tape in the Instron test (63 lb.) indicated the tape probably would fail very rapidly in the peel mode in the impact test even though the nylon backing probably would not tear.

Additional splices of the same eight inch flat width casing were made using both tapes. A two inch wide strip of the Patco tape was overwrapped with a three inch wide strip of the 3M tape in accordance with the present invention. The spliced casings were moisturized, impregnated with liquid smoke and allowed to age to insure that the moisture content throughout the casing equilibrated to at least 20% by weight. After six weeks the casings were subjected to both Instron and impact testing as described hereinabove. In the Instron test, the splice held fast under a loading, on average, of 200 lb. At this loading the casing broke at a point spaced from the splice. In the impact test the samples withstood over ten very quickly repeated slams without failing.

To further test the splice, rolls of fifteen hundred (1500) feet of the same fibrous casing were made with ten (10) splices per roll using the Patco and 3M tapes as described. Splices were made with the ends of the casing telescoped as shown in FIG. 5, with butted ends as in FIG. 6 and with a gap between the adjacent ends as shown in FIG. 7. Also, some splices were made with the laps 20, 32 of the tapes on opposite sides of the casing as in FIGS. 5 and 6 and some splices were made with the laps on the same side of the casing as shown in FIG. 7. After making the splices the casings were moisturized to at least 20% moisture and then they were rolled and aged for four days. After the aging period the rolls were stuffed in a conventional ham stuffing operation without experiencing a single splice failure. Similar results were obtained with rolls of smoke impregnated casings containing at least two splices per each fifteen hundred foot roll and aged for two weeks prior to stuffing.

These results, under actual production line stuffing conditions, were exceptional considering that prior to using two tapes in accordance with the present invention, splices made with a single pressure sensitive adhesive were ineffective and not suitable for use in a commercial production line environment. In a preferred method as set out hereinafter the splices are made when the casings are at a moisture level of about 6% by total casing weight and then the casings are moisturized to bring the moisture level up to at least 20% by total casing weight. However, the method invention is not limited to this sequence and the casing can be spliced as disclosed hereinafter even after moisturization to at least 20% by weight.

Having thus described the invention in detail, what is claimed as new is:

1. A spliced cellulosic casing comprising:
   (a) at least two lengths of cellulosic casing having adjacent ends longitudinally axially aligned, each said casing lengths having
      (i) a moisture content of at least 20% by total casing weight,
      (ii) a first portion located next to the casing end to be joined, and
      (iii) a second portion located more inboard from said casing end than said first portion:
   (b) a first pressure sensitive adhesive tape encircling said adjacent ends and disposed against said casing lengths, said first tape being in only pressure sensitive adhering relationship with said casing lengths wherein opposite lateral side edges of said first tape adhere directly to said first portion of each casing length for joining said lengths together; and
   (c) adhesive tape means encircling and disposed in only pressure sensitive adhering relationship against said first tape, said adhesive tape means having lateral side margins which overlap the opposite lateral side edges of said first tape and adhere in only pressure sensitive adhering relationship directly to said second portion of each of said casing lengths, said adhesive tape means comprising means to restrain the separation of said overlapped first tape side edges from said casing lengths responsive to transverse and longitudinal loading on said spliced casing.

2. A spliced cellulosic casing as in claim 1 wherein said tape means is a second adhesive tape which is wider than said first tape and each lateral side margin of said second tape overlaps one of the opposite side edges of said first tape.

3. A spliced cellulosic casing as in claim 1 wherein said adhesive tape means comprises two strips of a second tape each disposed with one of its side margins overlapping a side edge of said first tape.

4. A spliced cellulosic casing as in claim 3 wherein each of said second tapes is narrower than said first tape.

5. A spliced cellulosic casing as in claim 1 wherein said first tape has an acrylic based pressure sensitive adhesive on one surface thereof.

6. A spliced cellulosic casing as in claim 5 wherein said acrylic based pressure sensitive adhesive comprises 2-ethylhexylacrylate.

7. A spliced cellulosic casing as in claim 1 wherein said adhesive tape means has a rubber based pressure sensitive adhesive on one surface thereof.

8. A spliced cellulosic casing as in claim 7 wherein said rubber based adhesive comprises an epoxidized polybutadiene polystyrene copolymer in approximately a 4:1 to 5:1 ratio.

9. A spliced cellulosic casing as in claim 1 wherein said lengths of cellulosic casing have their adjacent ends telescoped one into another.

10. A spliced cellulosic casing as in claim 1 wherein said first tape and said adhesive tape means each have ends which encircle said casing lengths and lap one over another.

11. A spliced cellulosic casing as in claim 10 wherein the laps formed by the ends of said first tape and said adhesive tape means are disposed at diametrically opposite sides of said joined casing lengths.

12. A spliced cellulosic casing as in claim 1 wherein said first adhesive tape has a tensile strength lower than said adhesive tape means and said adhesive tape means has a lower adherence to said cellulosic casing than said first adhesive tape.

13. A spliced cellulosic casing comprising:
(a) at least two lengths of fibrous cellulosic casing having adjacent ends positioned with one of said ends telescoped into the other, and each of said casing lengths having a moisture content of at least 20% by total casing weight;
(b) a first pressure sensitive adhesive tape encircling said telescoped ends and disposed thereagainst in only pressure sensitive adhering relationship, said first tape having its opposite lateral side edges adhering directly to said casing lengths for joining said lengths together and said first tape having its opposite ends lapped one over another; and
(c) a second pressure sensitive tape encircling and disposed in only pressure sensitive adhering relationship against said first tape, said second tape being wider than said first tape and having opposite lateral side margins which overlap said first tape side edges and which are adhered in only pressure sensitive adhering relationship to each of said casing lengths, said second tape comprising means for restraining the separation of said first tape side edges from said casing lengths.

14. A method for splicing cellulosic casing comprising the steps of:
(a) longitudinally axially aligning the ends of cellulosic casing lengths to be joined:
(b) wrapping a first pressure sensitive adhesive tape around the aligned ends and adhering said tape by pressure alone to each of the casing lengths with the opposite lateral side edges of the first tape adhering to a first portion of each casing length located next to the aligned ends for joining the lengths together; and
(c) wrapping a second pressure sensitive adhesive tape with the opposite lateral side margins of the tape around the aligned casing ends and overlapping the opposite lateral side edges of the first tape with the lateral side margins of the second tape for adhering the second tape by pressure alone directly to both the first tape and to a second portion of each casing length located more inboard from the aligned casing ends than the first portion; and
(d) utilizing the overlapping disposition of the second tape side margins with respect to the first tape side edges as means for restraining the separation of the first tape side edges from their pressure sensitive adhering relationship with the joined casing lengths.

15. A method as in claim 14 wherein said second pressure sensitive adhesive tape is wider than said first tape and at said wrapping step (c), the opposite side margins of the second tape overlap the opposite side edges of the first tape for adhering each of the opposite side margins directly to the second portion of each of the casing lengths.

16. A method as in claim 14 wherein said wrapping step (b) is accomplished using an adhesive tape having an acrylic based pressure sensitive adhesive comprising 2-ethylhexylacrylate.

17. A method as in claim 14 including the step of telescoping one of said aligned ends into the other prior to said wrapping steps (b) and (c).

18. A method as in claim 14 including the step of moisturizing the casing lengths after step (c) from a moisture level of about 6% of total casing weight to a moisture level of at least 20% by total casing weight.

* * * * *